(12) United States Patent
Bryg et al.

(10) Patent No.: US 6,216,214 B1
(45) Date of Patent: Apr. 10, 2001

(54) APPARATUS AND METHOD FOR A VIRTUAL HASHED PAGE TABLE

(75) Inventors: William R. Bryg, Saratoga; Stephen G. Burger, Santa Clara; James O. Hays, San Jose, all of CA (US); John M. Kessenich, Fort Collins, CO (US); Jonathan K. Ross, Sunnyvale, CA (US); Gary N. Hammond, Campbell, CA (US); Sunil Saxena, Sunnyvale, CA (US); Koichi Yamada, San Jose, CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/018,326

(22) Filed: Feb. 3, 1998

Related U.S. Application Data

(63) Continuation-in-part of application No. 08/747,943, filed on Nov. 12, 1996, now Pat. No. 5,809,563.

(51) Int. Cl.[7] ........................................ G06F 12/10
(52) U.S. Cl. ............................ 711/207; 711/203; 711/206
(58) Field of Search ................................. 711/206, 3, 207, 711/216, 203, 205

(56) References Cited

U.S. PATENT DOCUMENTS

| | | | |
|---|---|---|---|
| 4,680,700 | * 7/1987 | Hester et al. | 711/206 |
| 5,392,410 | * 2/1995 | Lin | 711/3 |
| 5,526,504 | * 6/1996 | Hsu et al. | 711/207 |
| 5,713,001 | * 1/1998 | Eberhard et al. | 711/216 |
| 5,724,538 | * 3/1998 | Morris et al. | 711/206 |
| 5,751,990 | * 5/1998 | Krolak et al. | 711/207 |
| 5,809,563 | * 9/1998 | Yamada et al. | 711/207 |
| 5,835,964 | * 11/1998 | Draves et al. | 711/207 |
| 5,860,144 | * 1/1999 | Frank et al. | 711/206 |
| 6,012,132 | * 1/2000 | Yamada et al. | 711/207 |

* cited by examiner

Primary Examiner—John W. Cadeca
Assistant Examiner—Fred F. Tzeng

(57) ABSTRACT

The present invention generally relates to an apparatus and method for efficiently translating virtual addresses utilizing either single address space or multiple address space models in a virtual memory management system. In particular, a Virtual Hash Page Table (VHPT), an extension of the Translation Lookaside Buffer (TLB) hierarchy, is designed to enhance virtual address translation performance. Virtual Hash Page Table (VHPT) efficiently supports two different methods of operating systems use to translate virtual addresses to physical addresses. This directly benefits the highly frequented path of address resolution.

17 Claims, 9 Drawing Sheets

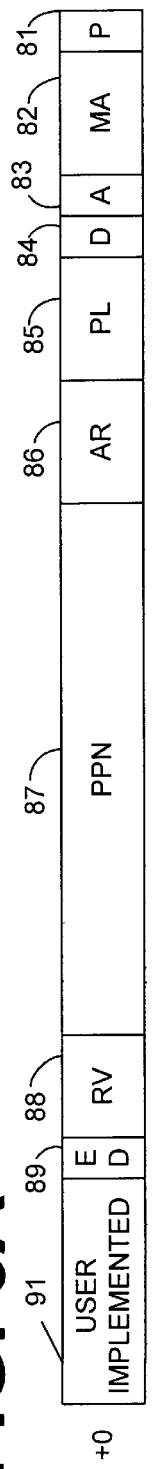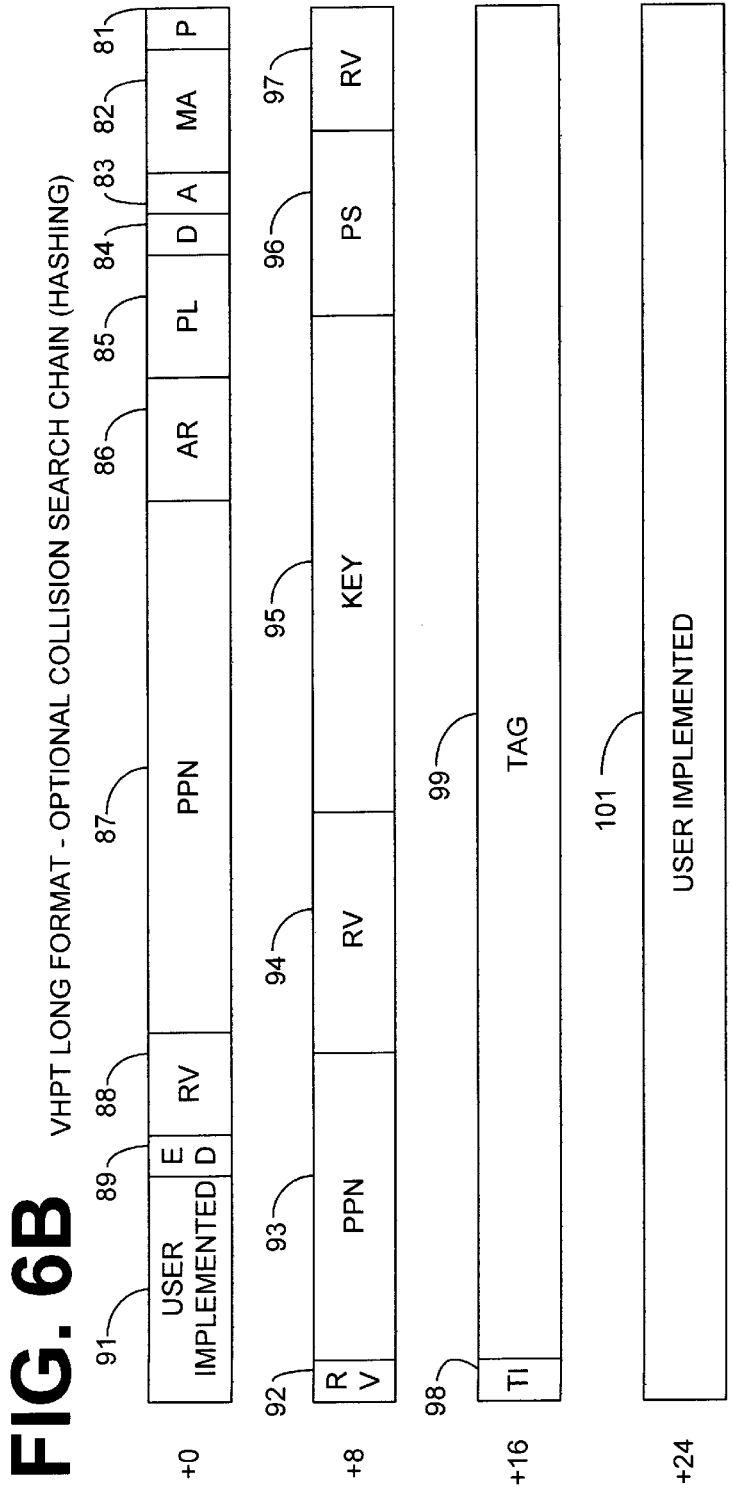
FIG. 6A VHPT SHORT FORMAT - OPTIONAL SYSTEM PAGE TABLES
FIG. 6B VHPT LONG FORMAT - OPTIONAL COLLISION SEARCH CHAIN (HASHING)

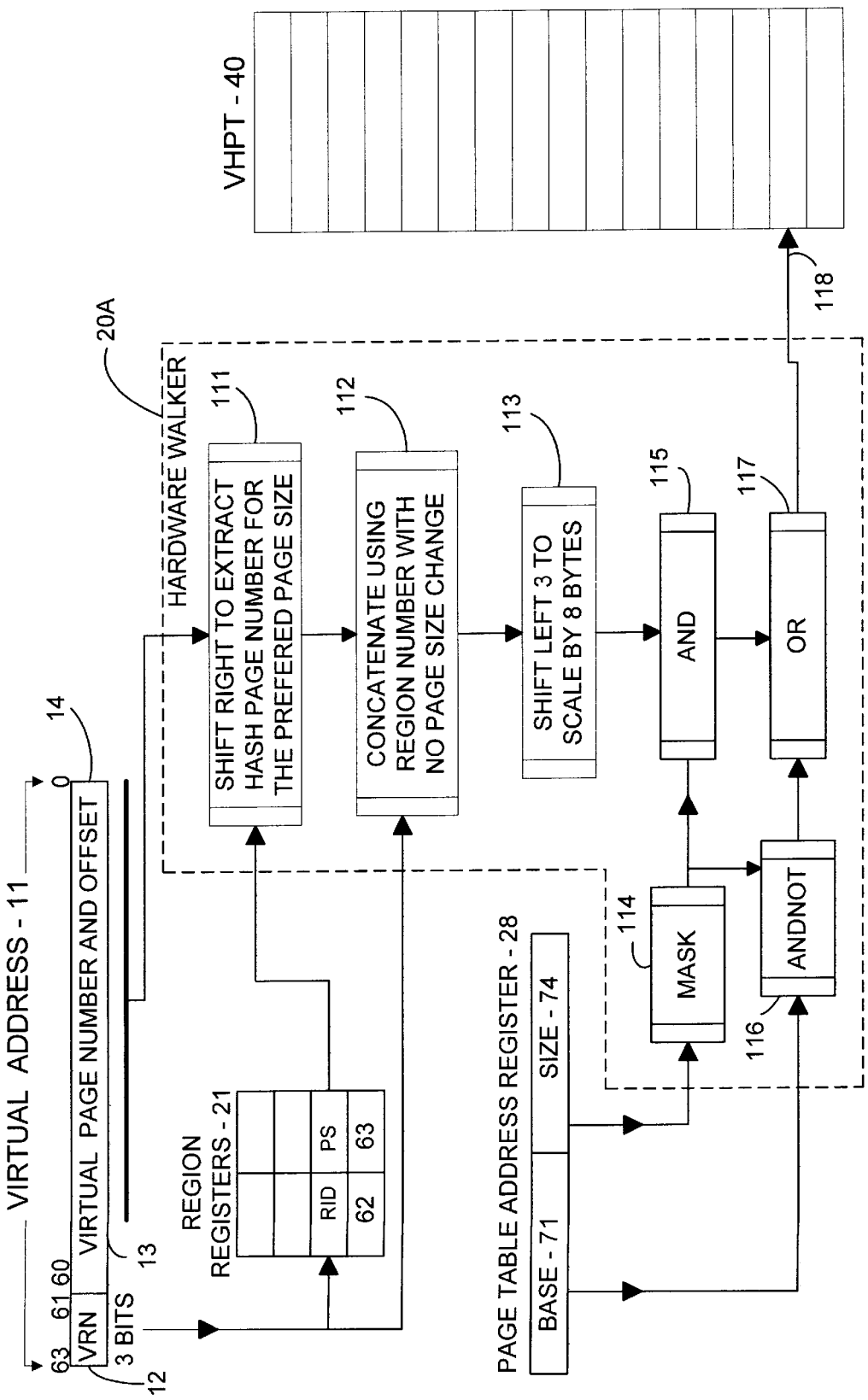

APPARATUS AND METHOD FOR A VIRTUAL HASHED PAGE TABLE

CROSS-REFERENCE TO RELATED APPLICATIONS

CLAIM OF PRIORITY AND CROSS REFERENCE TO RELATED APPLICATIONS

This application is a continuation of U.S. Ser. No. 08/747943 filed Nov. 12, 1996 U.S. Pat. No. 5,809,563, issued Sep. 15, 1998 entitled "METHOD AND APPARATUS UTILIZING A REGION BASED PAGE TABLE WALK BIT."

BACKGROUND OF THE INVENTION

1. Field of the Invention

The present invention generally relates to an apparatus and method for efficiently translating virtual addresses utilizing either single address space or multiple address space models in a virtual memory management system. In particular, a virtual hash page table (VHPT), an extension of the translation lookaside buffer (TLB) hierarchy, is designed to enhance virtual address translation performance. In addition, the VHPT is also designed to be efficiently utilized with either multiple address space (linear page table per address space) or single address space (hashed page table) methods.

2. Description of Related Art

Virtual addresses must be mapped (translated) into physical addresses before they can be read or written. Due to the high frequency of such mappings, their size and performance is critical to the performance of the system as a whole. There are two basic types of mapping methods, the single address space (typically associated with a hashed page table), and multiple address space models (typically associated with page tables).

Operating systems create and maintain these mappings in data structures that are specific to the operating system. Hardware must have mappings organized in ways it understands. One such hardware structure that must understand the mapping structure is a Translation Lookaside Buffer (TLB), which is typically used to cache a small number of recently used translations where the central processing unit (CPU) can quickly access and apply them. The work in loading the cache with proper translations is split between the hardware and software. The balance of this split is highly dependent on a number of criteria, including the data structures used by the hardware and software to represent these mappings outside the TLB. The criteria is hardware architecture and implementation specific. The range varies between full hardware control over TLB insertion to full software control over TLB insertion.

Multiple-address-space based operating systems tend to use forward mapped page tables to store translations, and need a small amount of information per mapping. This can be made even more efficient if the page tables are allocated contiguously in virtual space, allowing a single linear lookup to find a translation. Windows NT is an example of such an operation system.

Single-address-space based operating systems need more information per mapping (e.g. protection domain information), and make more efficient use of a hashed page table. HP-UX, which is manufactured and commercially available from Hewlett Packard Company, USA, is an example of such an operating system.

Until now, processor architectures have lacked the ability to efficiently utilize both single-address and multiple-address space references for translation from virtual addresses to physical addresses, and match the operating system native format. Other processor architectures could either manage a virtual linear table, or a physical hash table, or a physical forward mapped page tables mappings. The present invention is the first time that support of translations, both single-address and multiple-address spaced models, from virtual addresses to physical addresses has been provided in virtual space.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentality's and combinations particularly pointed out in the appended claims.

To achieve the advantages and novel features, the present invention is generally directed to a configurable virtual hash page table (VHPT). This data structure and mechanism are used to represent and access the mappings between virtual addresses and physical addresses. The data structure is accessed through virtual address references. Both hardware and software can use VHPT to lookup mappings, however only software can write to the VHPT.

One embodiment of the VHPT apparatus and method for utilizing the VHPT, is the single architectural feature that stores virtual to physical address mappings, and efficiently supports two different methods of virtual address mapping operating systems. This is permissible, since the VHPT is configurable to allow either linear access or hashed access. This invention increases the number of important operating systems that can directly share their method of managing virtual to physical mappings with the hardware. Without it, more operating systems would have to maintain two data structures: one for the operating system and one for the hardware. This costs engineering time, as well as end user time and memory.

The form of use taken by the VHPT, either a virtual linear table or as a virtual hash table, is determined by the Page Table Address (PTA) Control Register. Fields in this register determine the size of the entries, either 8-byte or 32-byte-entries in the VHPT, associated with whether or not the VHPT is linear or hashed. A VHPT using 8-byte entries is referred to as a short format VHPT, while one using 32-byte entries is referred to as a long format VHPT. The short format is typically used for a virtual linear page table, while the long format is typically used for a hashed page table.

An alternate embodiment provides an apparatus and method for implementing a hardware VHPT walker that can, without software intervention, resolve a TLB-miss by looking up the mapping in the VHPT.

In another alternate embodiment, nested data TLB misses are supported, because the VHPT is virtual, and attempts to resolve virtual to physical mappings can result in nested requests for other virtual to physical mappings. Hence, the architecture provides support for efficiently and simply managing nested TLB misses.

In another alternate embodiment, hardware provides instructions for software to access and utilize the VHPT much like the hardware does.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 6A is a diagram of the format for VHPT translation entries in the linear page table configuration for the VHPT 40, shown in FIG. 3.

FIG. 6B is a diagram of the format for VHPT translation entries in the hashed page table configuration for the VHPT 40, shown in FIG. 3.

FIG. 7 is a block diagram of the hardware walker's 20 process, as shown in FIG. 3, for searching the VHPT entries in the linear page table configuration.

Figure 1:
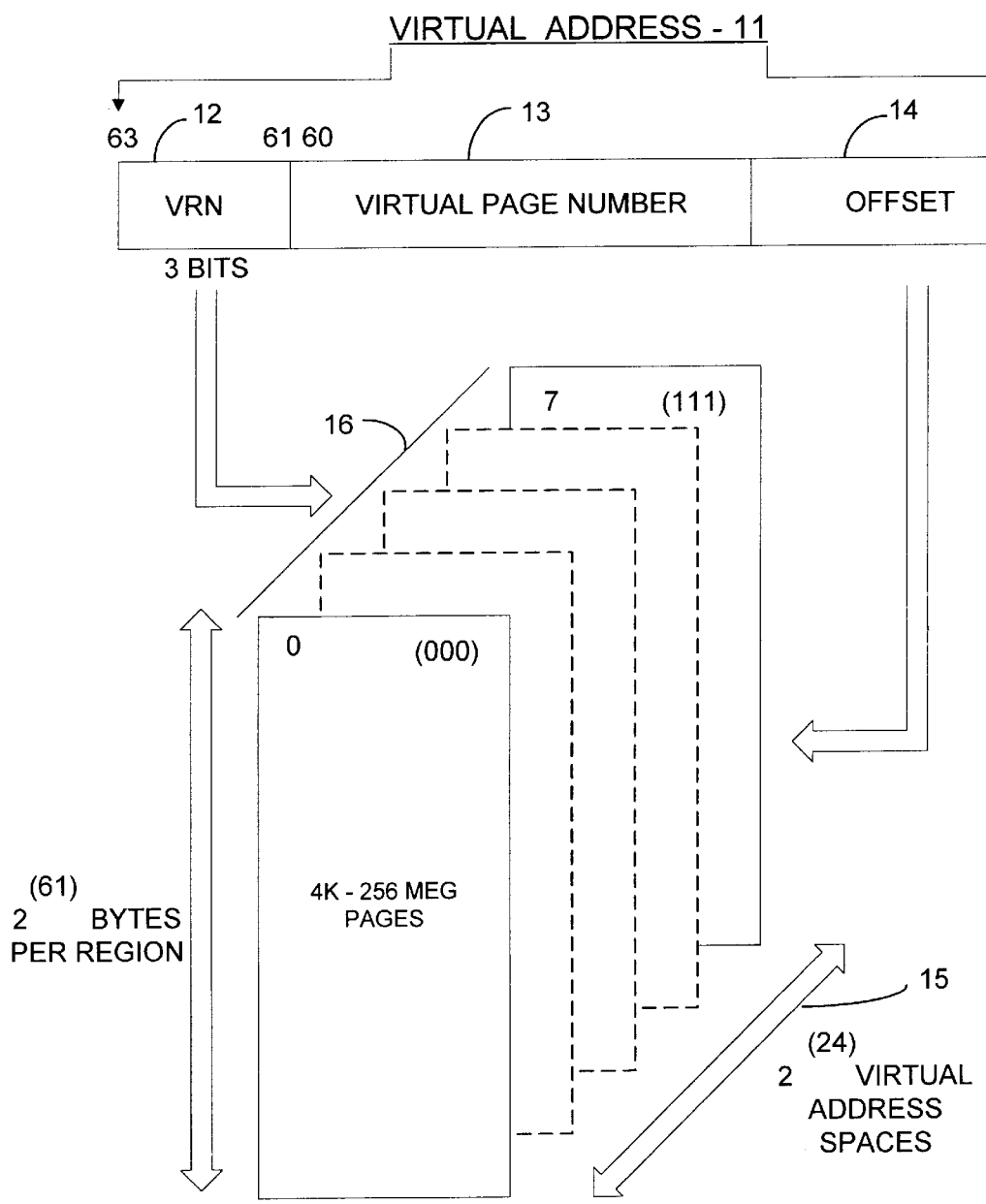
FIG. 1 is a block diagram of the virtual address model layout of the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

As seen by application programs, the virtual addressing model is fundamentally a 64-bit flat linear virtual address space. 64-bit general registers are used as pointers into this address space.

Figure 2:
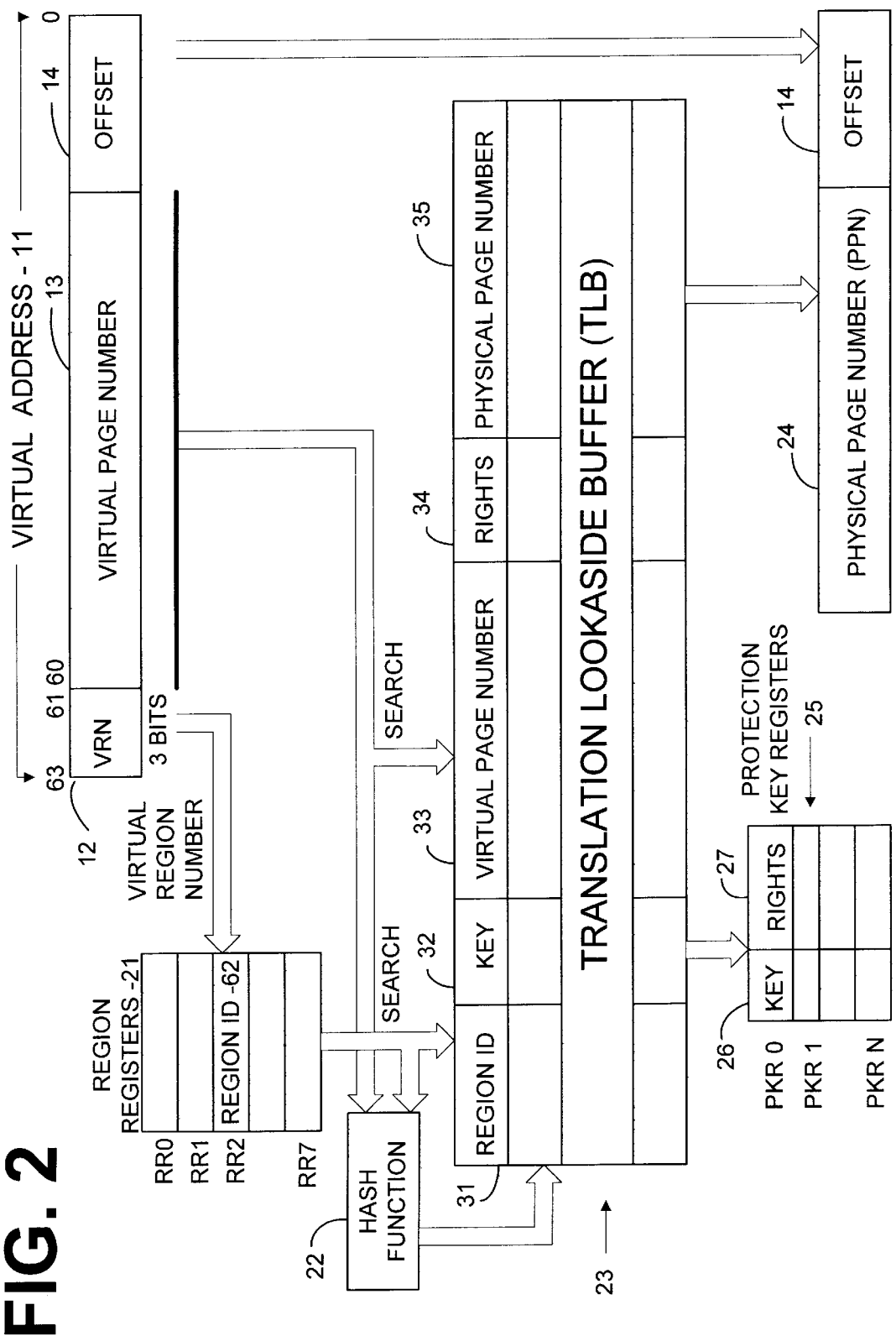
FIG. 2 is a block diagram of the process to map a virtual address to a physical address if the translation is present in the TLB for the present invention.

As shown in FIG. 1, the 64-bit virtual address space 11 is divided into eight $2^{(61)}$ byte virtual regions 16. The region 16 is selected by the upper 3-bits of the virtual address 11, which is the virtual region number 12. Associated with each virtual region is a region register 21 (FIG. 2) that specifies a 24-bit region identifier (unique address space number) 62 (FIG. 4) for the region. Eight out of the possible $2^{(24)}$ virtual address spaces are concurrently accessible via the 8 region registers 21 (FIG. 2). The region identifier 62 (FIG. 4) can be considered the high order address bits of a large 85-bit global address space for a single address space model, or as a unique ID for a multiple address space model.

By assigning sequential region numbers, regions can be combined to produce larger 62, 63 or 64-bit spaces. For example, an operating system could implement a 62-bit region for process private data, 62-bit region for I/O, and a 63-bit region for globally shared data. Default page sizes and translation policies can be assigned to each virtual region.

FIG. 2 shows the process of mapping a virtual address into a physical address. Each virtual address is composed of three fields: the virtual region number (VRN) 12, the virtual page number (VPN) 13, and the page offset 14. The upper 3-bits select the virtual region number 12. The least-significant bits form the page offset 14. The virtual page number 13 consists of the remaining bits. The VRN bits 12 are not included in the VPN 13. The page offset bits 14 are passed through the translation process unmodified. Exact bit positions for the page offset and VPN bits vary depending on the page size used in the virtual mapping.

On a memory reference, the VRN bits 12 select a Region Identifier (RID) 62 from 1 of the 8 region registers 21, the TLB 23 is then searched for a translation entry with a matching VPN 33 and RID 62 value. If a matching translation entry is found, the entry's physical page number (PPN) 35 is concatenated with the page offset bits 14 to form the physical address. Matching translations are qualified by page-granular privilege level access right checks 34 and optional protection domain checks 34 by verifying the translation's key 32 is contained within a set of protection key registers 25 and read, write, execute permissions are granted.

Figure 3:
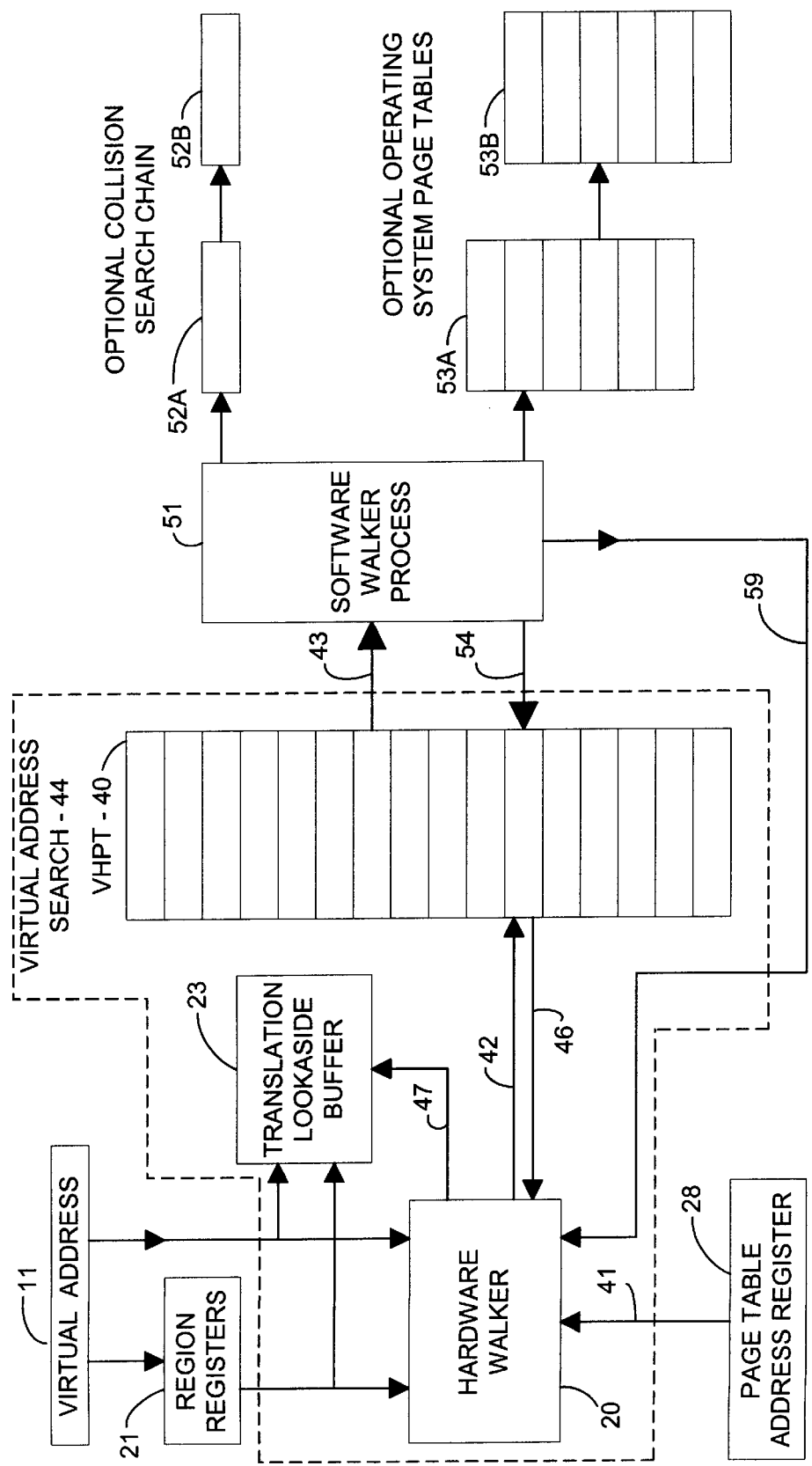
FIG. 3 is a block diagram of the Virtual Hashed Page Table layout of the present invention.

Referring to FIG. 3, illustrated is the block diagram of the virtual address search process 44 necessary if the required translation is not resident in the TLB 23. The processor may optionally continue to perform the virtual address search 44, in the VHPT structure 40 in memory for the required translation and after acquiring the required entry on link 46, install the entry into the TLB 23 using the hardware walker 20 on link 47. After the operating system installs the translation in the TLB 23 utilizing hardware walker 20, and/or VHPT utilizing software walker process 51 on link 59, the faulting instruction can be restarted and execution resumed. If the required entry cannot be found in the TLB 23 and/or VHPT 40, the processor raises a TLB miss fault to request that the operating system supply the translation.

Virtual addressing for instruction references is enabled when a program status register flag is asserted (not shown for simplicity), and for data references when a second program status register flag is asserted (not shown for simplicity), and for register stack accesses when a third program status register flag is asserted (not shown for simplicity). This virtual address search process 44 will be discussed in detail hereafter with reference to FIGS. 9 and 10.

With further reference to FIG. 3, shown is a block diagram of the VHPT 40. The VHPT 40 is an extension of the TLB 23 hierarchy designed to enhance virtual address translation performance. The VHPT 40 resides in the virtual memory space and is organized as a flat direct-mapped (1-way set associative) table. The VHPT 40 is configurable as either a large translation cache in memory, or the primary page table of the operating system. Since the VHPT 40 resides in the virtual address space, an additional, nested, TLB miss can be raised when the VHPT 40 is referenced. This property allows the VHPT 40 to also be used as a linear page table avoiding overhead of walking multilevel tables.

A hardware VHPT walker 20 provides significant performance enhancements by reducing the rate of flushing the processor's pipelines due to a TLB Miss fault, and by providing speculative translation fills concurrent to other processor operations. The processor does not manage the VHPT 40 or perform any writes into the VHPT 40. Software 51 is responsible for insertion of an entry 54 into the VHPT (including replacement algorithms), dirty/access bit updates, invalidation due to purges and coherency in a multiprocessor system. The processor does not ensure the TLBs are coherent with the VHPT 40 memory image.

Figure 4:
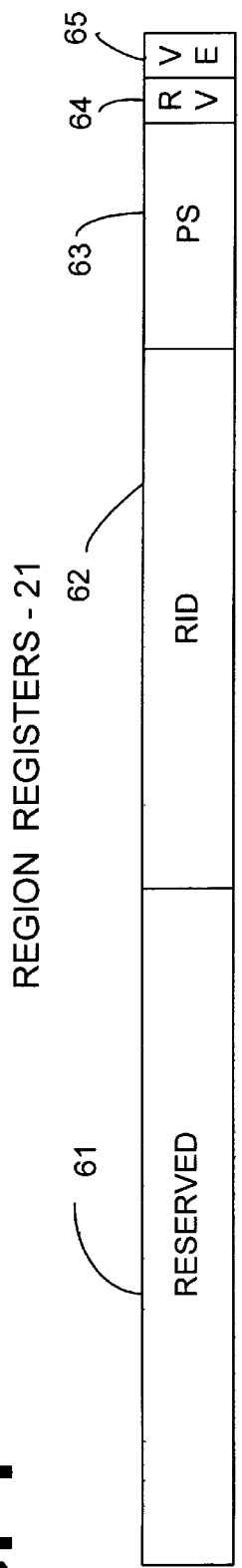
FIG. 4 is a block diagram of the Region Registers utilized by the present invention, as shown in FIG. 3 above.

The processor's VHPT walker 20 can optionally be configured to search the VHPT 40 for a translation after a failed instruction or data TLB search. The VHPT hardware walker 20 checks the first VHPT entry 42 addressed by an address it computes using the base address of the VHPT 40 obtained from the page table address register 28 on link 41, the virtual address 11, region identifier 62 (FIG. 4), and preferred page size bits 63 (FIG. 4). The computing of the VHPT entry address 42 is herein described in detail with reference to FIG. 7 and FIG. 8.

If additional TLB misses are encountered during the VHPT 40 access, a VHPT Translation fault is raised. If utilizing the hashed long format, herein described in detail with regard to FIG. 6B, and the VHPT entry contains the same region identifier and virtual address, the translation is installed into the TLB 23, and execution continues. Otherwise the processor raises a TLB miss fault. In the linear page table short format, herein described in detail with regard to FIG. 6A, the VHPT entry is inserted into the translation cache without verifying virtual address or region identifiers.

When a TLB miss is raised, software walker 51 may optionally search additional VHPT collision chains 52 (A&B) (associativities) for long format entries or search for translations 53 (A&B) in an alternate page table. The additional search is conducted utilizing the translated address obtained, on link 43, after the TLB miss is raised. Performance is optimized by placing frequently referenced translations within the VHPT structure 40 directly searched by the processor.

With reference to FIG. 4, associated with each of the eight virtual regions 16 (FIG. 1) is a privileged region register 21. Each register 21 contains a region identifier (RID) 62, a page size (PS) 63, and a VHPT walker enabled attribute 65. The values placed in the region register 21 by the operating system can be viewed as a collection of process address space identifiers. Regions 16 support multiple address space operating systems by avoiding the need to flush the TLB 23 (FIG. 3) on a context switch. Sharing between the processes is promoted by mapping common global or shared region identifiers into the region register 21 working set of multiple processes.

Figure 5:
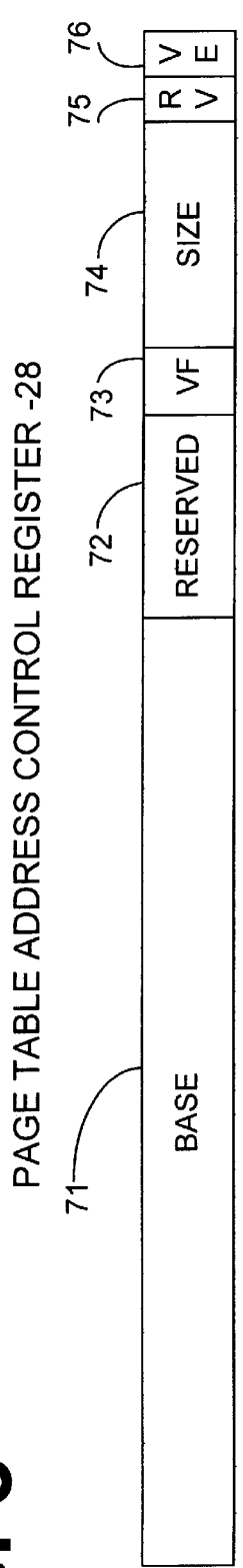
FIG. 5 is a block diagram of the Page Table Address Control Register utilized by the present invention, as shown in FIG. 3 above.

With reference to FIG. 5, the page table address (PTA) register 28 anchors the VHPT 40 in the virtual address space and controls VHPT 40 size and configuration information.

The base 71 in the virtual address control register 28 defines the starting virtual address of the VHPT 40. The base 71 is logically OR'ed with the computed index produced by the VHPT hash function items 111–113 (FIG. 7) or 131 (FIG. 8) when referenced by the VHP 40. The base 71 is aligned on a natural boundary otherwise the processor operations are undefined. For example, a 64K-byte table is aligned on a 64K-byte boundary.

Two VHPT formats are defined to support the linear and hash page table configurations, a short 8-byte format and a long 32-byte format. No mixing of formats is allowed within the VHPT. The VF 73 defines the VHPT table 40 format. When the VF is deasserted, the 8 byte short format entries are used, or when the VF is one, 32 byte long format entries are used.

By changing the VHPT hashing format parameter in field VF 73 and the size 74, specified in the Page Table Address register 28, the VHPT 40 can be configured as either a hash page table or a single-level virtual linear page table structure. Using the size 74, in PTA register 28, operating systems can tune the size of the hash page table based on the size of physical memory and operating system performance requirements. For linear page tables, the size of the VHPT 40 table is expanded to include all possible virtual mappings, effectively creating a large single flat page table within the virtual address space.

To enable short format hashing the VF field 73, in PTA register 28, is deasserted. Long format hashing is achieved by asserting the VF field 74 (long format) in PTA register 28, and asserting the size field 74 in PTA register 28, to a number significantly smaller than the 64-bit virtual address space. The exact number is based on operating system performance requirements. The VHPT walker is enabled for a region when the VE 76 field is asserted.

In FIG. 6A, the short format of the VHPT entries are shown. The present bit (P) 81 indicates that when deasserted, references using this translation are cause to issue an instruction or data page not present fault. This bit is used to indicate the mapped physical page is not resident in physical memory. The memory attribute 82 (MA) describes the cacheability, coherence, write policy and speculative attributes of the mapped physical page. Access bit (A) 83 when deasserted, triggers an instruction or data access bit fault on reference for tracing or debugging purposes. Dirty bit (D) 84 when deasserted causes any store or semaphore reference to the page to cause a dirty bit fault. The privilege level (PL) 85 specifies a privilege level or promotion level of the page and controls using four levels of privilege. Privilege level zero is the most privileged and has access to all privileged instructions. Privilege level three is the least privileged. Access rights 86 (AR) is also used in page granular read right and execute permission and privilege controls. The physical page number (PPN) 87 provides the most significant bits of the mapped physical address depending on the page size used in the mappings. Reserve area 88 is a reserved for later utilization, and user implemented space number 91 is left for specific user functionality definition. When exception deferral number (ED) 89 is asserted, a fault on the speculative load is forced to indicate a deferred exception.

The short format (FIG. 6A) is typically used in the linear page table configuration. The size of the linear page table depends on the size of the mapped virtual address space 15. To map all implemented virtual addresses 11, the size 74 field, in the PTA register 28, must be equal to or larger than the bytes on a given processor-model where the bytes are the size of the implemented virtual address space, $2^{12}$ is the smallest page size, and $2^{3}$ is the size of each VHPT entry. The implemented virtual address space 15 is the model-specific.

In FIG. 6B, the long format of the VHPT entries are shown. The lowest order 64 bits or 8 bytes duplicate the short format definitions discussed above.

The second eight byte entry in the VHPT long format is reserve field (RV) 97 included for future utilization. The next field is the page size (PS) 96, which is utilized to define the preferred page size of the access region. The third entry is the key 95 which is used to point to the protection key registers 25 (FIG. 2). The protection key registers 25 (FIG. 2) provide a method to restrict permission by tagging each virtual page with a unique protection domain identifier. The protection key registers 25 (FIG. 2) also define the rights with regard to read, write and execute protection checks. If these checks fail a key permission fault is raised (not shown). The next entry in the VHPT long format is the upper bits of the physical page number (PPN) 93. These extra bits are provided to allow access of a greater table since the hashing table is one long format. Last of the second eight bytes is the reserve field 92 which is reserved for further implementation.

The third eight bytes in the VHPT long format entries include the tag field number 99. The translation tag is used in conjunction with the VHPT hash index to uniquely identify a translation. The translation tags are computed by hashing the virtual page number, and the region ID number will herein be further identified with regard to FIG. 8. The last bit of the third eight bytes of the VHPT table is the tag invalid bit number 98. If the tag invalid bit is deasserted, this indicates that tag 99 is an invalid tag. This is utilized by software to invalidate the long format VHPT entries in memory.

The last eight bytes of the 32 byte VHPT long format entry is user implemented 101, and may store values such as a link address to extend collision chains when a hash entry collision is detected when used as a hashed table entry.

Illustrated in FIG. 7, is the diagram VHPT hardware walker's 20A short format lookup process 44 for the hash function for a short format entry (FIG. 6A). A request for an item in virtual memory 15 (FIG. 1) causes an instruction to produce an index (e.g. output of block 113), by using the Virtual Page Number 13 with the referenced region register 21, referenced region identifier 62 and the preferred page size 63. The VHPT entry's address 118 is generated by scaling the virtual page number 13 and offset 14, by the preferred size of the region 63, as shown in block 111. Next the VRN 12 is concatenated in block 112 with the value result from operation 111. The concatenated result from operation 112 is shifted left 3 bits to scale the size of the result by 8 bytes in block 113. Next, the masking off bit positions specified by the size 74 field in the PTA register 28, in block 114, and logically ORing the base 71, in the PTA register 28, in block 117. This last operation simply adds the naturally aligned base and the computed offset to derive the address of the VHPT entry 118.

The following is the pseudo-code version of the VHPT walker's short format hash function.

```
Mask = 2^PTA.size - 1
HPN = VA{IMPL_VA_MSB:0} >> RR[VA{63:61}].ps
HRN = VA{63:61} << (IMPL_VA_MSB+1-12)
Hash_Index = HRN | HPN
VHPT_Addr = VA{63:61} || PTA.base{60:54} ||
   ((PTA.base{51:14} || zero{13:0}) & ~Mask) |
   ((Hash_Index << 3) & Mask))
```

Where

IMPL_VA_MSB is the most significant bit of the amount of virtual address space implemented on a particular embodiment of the invention

| | |
|---|---|
| {n:m} | is notation selecting a range of bits |
| << | is the shift left operator |
| \|\| | is the concatenate operator |
| \| | is the logical 'or' operator |
| RR[n] | is the nth region register |
| HPN | is the hash page number |
| HRN | is the hash region number |

Figure 8:
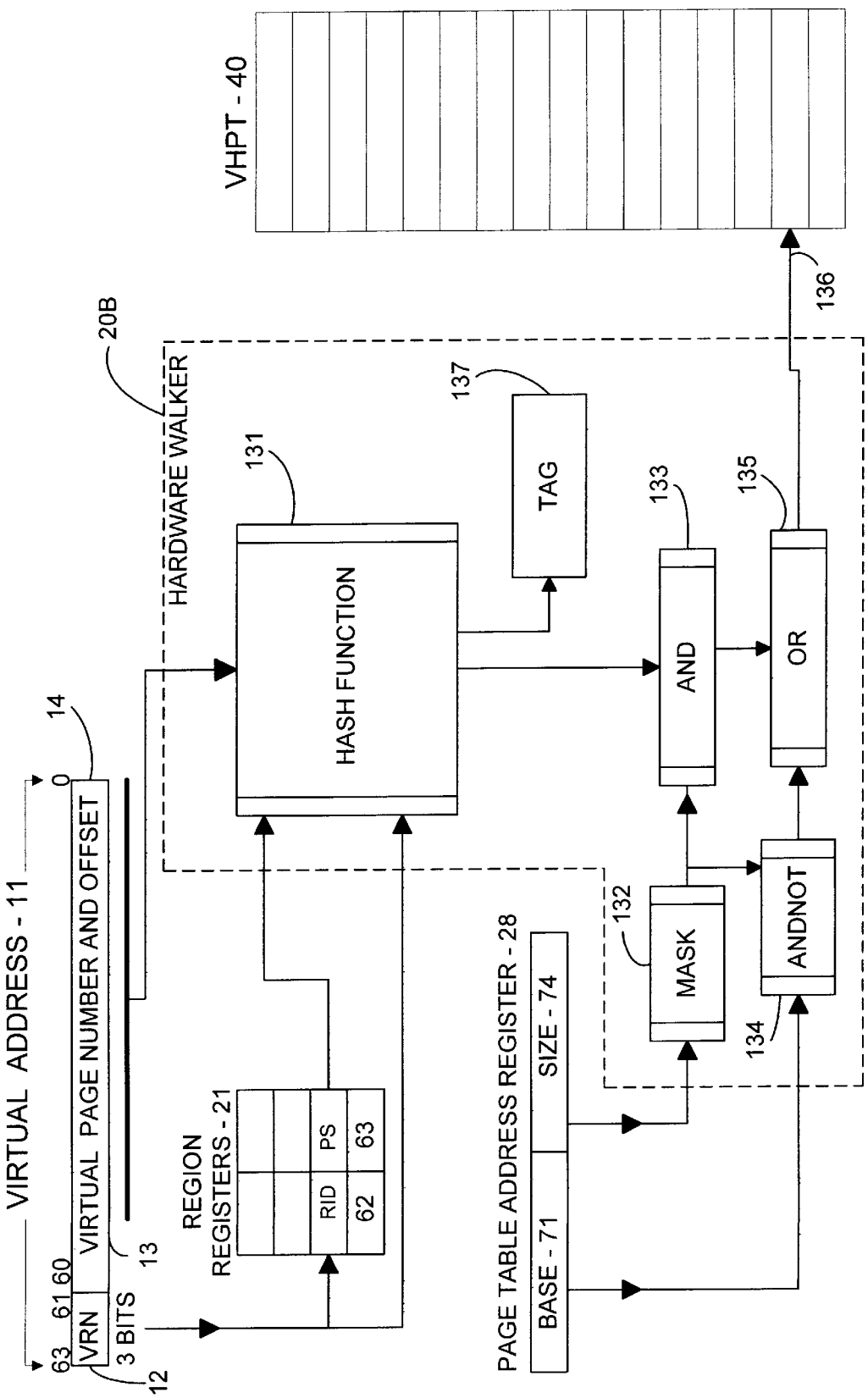
FIG. 8 is a block diagram of the hardware walker's 20 process, as shown in FIG. 3, for searching the VHPT entries in the hashed page table configuration.

In FIG. 8, the process used to compute the long format Hash look-up is shown. The long format hash 131 and tag generation 137 is implementation specific. All processor implementations guarantee that the most significant bit of the tag (ti bit FIG. 6B, item 98) is zero for all valid tags. The hash index 136 and tag 137 together uniquely identify a translation. The processor ensures that the indices into the hashed table, the region's preferred page size, and the tag specified in an indexed entry 136 can be used in a reverse hash function to uniquely regenerate the region identifier and VPN (virtual address bits 13) pair used to generate the index 136 and tag 137. This must be possible for all supported page sizes, VPNs and legal values of region identifiers 62 (FIG. 4). The hash function 131 is reversible if using the hash result and all but one input produces the missing input as the result of the reverse hash function. The easiest hash function and reverse hash function is a simple XOR of bits. To ensure uniqueness, software must follow these rules:

1. The minimum long format VHPT size is 32K bytes (1024 entries).
2. Software should use only one preferred page size for each unique region identifier, otherwise processor operation is undefined.
3. All tags for translations within a given region, must be created with the preferred page size assigned to the region, otherwise processor operation is undefined.
4. Software is not allowed to have pages in the VHPT 40 that are smaller than the preferred page size for the region, otherwise processor operation is undefined. Software can specify a page with a page size larger than the preferred page size in the VHPT, but tag values for the entries representing that page size must be generated using the preferred page size assigned to that region.

Referring again to FIG. 8, illustrated is the diagram for the hash function of the VHPT hardware walker's 20B long format lookup process 44 for the hash function 131 for a long format entry (FIG. 6B), which is implementation specific. An instruction produces a hash index by hashing the Virtual Page Number 13 with the referenced region register 21, preferred page size 63 and the referenced region identifier 62 in block 131. The VHPT entry's address 136 is generated by scaling the hash index by 32-bytes in block 131, masking off bit positions specified by size 74 field, in the PTA register 28, in block 133, and logically ORing the base 71 field, in the PTA register 28, in block 135. This last operation simply adds the naturally aligned base and the computed offset to derive the VHPT entry 136. Also generated by block 131 is the uniquely identifying 64-bit tag 137, from hashing the VPN 13 and referenced RID 62.

Sometime it is desirable for software, utilizing a software walker, to duplicate the Hash index 136 and tag 137 which the hardware walker computes when it does the VHPT look-ups. It is also necessary for software to generate the Hash index 136 and tag 137 when it inserts and removes VHPT entries to and from the VHPT table.

For this purpose, hardware provides two (2) instructions: thash and ttag. The software walker should use instructions when forming translation tags 137 and hash addresses 136 for the VHPT 40. These instructions encapsulate implementation specific hashing functionality and improve performance. The thash and ttag instructions are defined to operate on all page sizes supported by the translation cache, regardless of the VHPT walker's 20 supported page sizes. The PTA register 28 must be implemented on processor models that do not implement a VHPT walker. PTA register 28 is used when issuing ttag and thash instructions.

Figure 9:
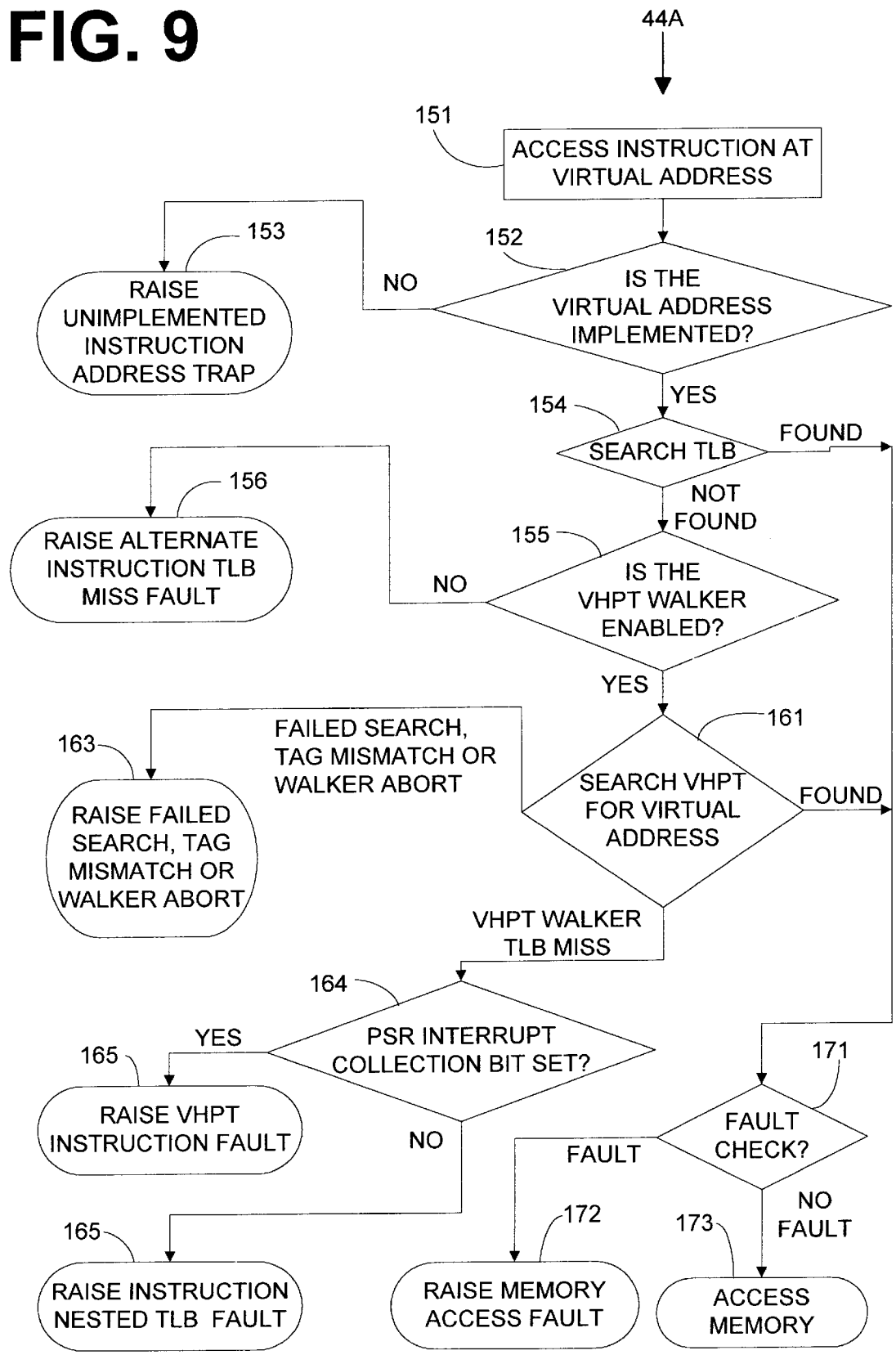
FIG. 9 is a flow chart of the process for an instruction access utilizing the virtual address search 44, shown in FIG. 3.
Figure 10:
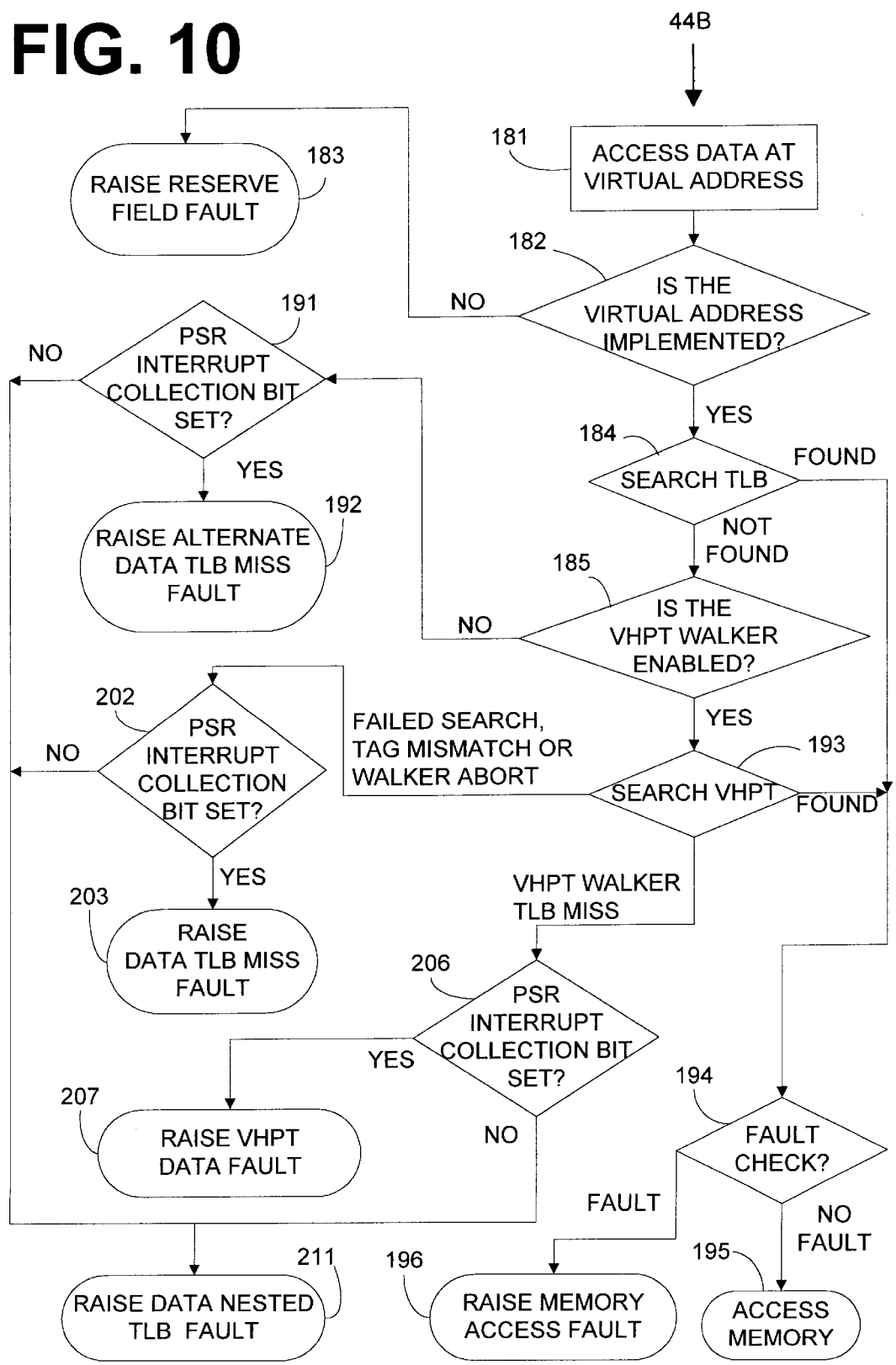
FIG. 10 is a flow chart of the process for a data access utilizing the virtual address search 44, shown in FIG. 3.

The general sequence of searching the TLB and VHPT, and which faults get raised under which conditions, is shown in FIG. 9 and FIG. 10.

Referring to FIG. 9, illustrated is the flow chart for processing of a virtual address search 44. As mentioned earlier, VHPT 40 accesses can fault, due to the VHPT 40 being accessed virtually. Hardware's access to the VHPT 40 to resolve an initial TLB miss may trigger another TLB miss, this time for the translation mapping the part of the VHPT 40 being accessed to resolve the first TLB miss. Software must provide fault handlers for these nested TLB misses. Hardware provides important functionality to aid software in these cases.

Most important are the type of fault hardware raises, the current state of the interruption collection bit (not shown for simplicity), and the information collected by hardware for software's use in handling a TLB miss fault. On any TLB miss, nested or not, hardware can provide a set of registers to software that describe the miss. This information includes where the miss occurred, what the attempted address was, and other useful information. Without special nesting features, hardware would simply always replace that information when a TLB-miss nests.

Whether or not, and how much information is provided to software is dictated by whether or not the interruption collection bit in the processor's status register is asserted (PSR.ic) (not shown for simplicity). The type of fault raised for a nested TLB miss depends on the state of PSR.ic (not shown for simplicity), as will be shown by FIGS. 9 and 10.

Accessing an instruction at a virtual address 11 (FIG. 1) occurs at step 151. Next, it is determined if the virtual address 11 is implemented at step 152. If the virtual address 11 resolved is not implemented, process flows to an unimplemented instruction address trap at step 153. If the virtual address 11 desired is implemented, a search of the TLB 23 is performed at step 154. If the search of the TLB 23 at step 154 results in a entry being found, the process proceeds to step 171 with a fault check on the entry. If there is no fault detected at step 171, the memory is accessed at step 173. If a fault is detected, a memory access fault is raised for processing at step 172.

If a virtual address desired is not found in the TLB 23, next it is determined if the VHPT walker 20 is enabled at step 155. If the walker is not enabled, process flows to step 156 where a raised alternative instruction TLB miss fault occurs. If the VHPT walker 20 is enabled, a search of the VHPT 40 is conducted at step 161. If the desired virtual address 11 is found in the VHPT 40, a fault check at step 171 is performed. If no fault is determined, the memory is accessed at step 173. If during the fault check a fault is detected, the memory access fault is raised for processing at step 172.

If the search of the VHPT 40 has not found an entry for the virtual address 11 desired, it is then determined that the VHPT walker translation look aside buffer experienced a miss. At that time, a failed search, tag mismatch or walker abort fault is raised for processed at step 163. If the VHPT walker 20 experienced a TLB miss, then the program status register (not shown for simplicity), is checked for the interrupt collection bit being asserted at step 164. If the program status register interrupt collection bit (not shown for simplicity), is asserted, then the VHPT instruction fault is raised for processing at step 165. If the program status register interrupt collection bit (not shown for simplicity), is not asserted, then the instruction nested TLB fault is processed at step 167.

Referring to FIG. 10, illustrated is the flow chart for resolving a data virtual address. At step 181 the desired data virtual address 11 (FIG. 1) is initiated. At step 182 it is determined whether or not the data virtual address 11 is implemented. If the data virtual address at step 182 is not implemented, the reserve field fault is raised for processing at step 183.

If the data virtual address is implemented, a search of the TLB 23 is conducted at step 184. If the search of the TLB 23 resolves the desired data virtual address 11, the process then performs a fault check at step 194. If no faults are detected, the physical memory is accessed at step 195. If, during the check a fault has been detected, the memory access fault is raised for processing at step 196.

If the search 44 of the TLB 23 at step 184 determines that the data virtual address 11 is not found, then a check to determine if the VHPT walker 20 (FIG. 3), is enabled is performed at step 185. If the VHPT walker is not enabled, the program status register's interrupt collection bit (not shown for simplicity) is checked at step 191. If the program status register interrupt collection bit (not shown for simplicity) is asserted, the alternate data TLB-miss fault is processed at step 192. If the program status register's interrupt collection bit (not shown for simplicity) is not asserted, a data nested TLB fault is raised at step 211.

If it is determined that the VHPT walker 20 (FIG. 3) is enabled, the search 44 of the VHPT 40 is conducted at step 193. If the data virtual address 11 is found, a fault check on the entry is performed. If there is no fault in the data virtual address entry, the physical memory is accessed at step 195. If it is determined that a fault has been detected, the memory access fault is raised at step 196.

If the VHPT search 44, in step 193, results in a failed search, tag mismatch or walker abort, the program status register interrupt collection bit (not shown for simplicity) is tested at step 202. If the program status register interrupt collection bit (not shown for simplicity) is asserted, then the Data TLB Missed fault is raised for processing at step 203. If the program status register interrupt collection bit (not shown for simplicity) is not asserted, then the instruction nested TLB fault is processed at step 211.

If the VHPT search 44, in step 193, results in a VHPT walker TLB miss, the program status register's interrupt collection bit (not shown for simplicity) is tested at step 206. If the program status register interrupt collection bit (not shown for simplicity) is asserted, the a VHPT Data Fault is raised at step 207. If the program status register's interrupt collection bit (not shown for simplicity) is not asserted, a data nested TLB fault is raised for processing at step 211.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A virtual hash page table apparatus for virtual address translation after a failed translation lookaside buffer search, comprising:
   a virtual address; and
   a mechanism used to compute a pointer from said virtual address to an index into a virtual hash page table, said index in the virtual hash page table comprising a translation to a physical address, said virtual hash page table apparatus is further configurable to allow both linear access and hashed access, and wherein said mechanism for virtual address translation further comprising:
      circuitry to provide virtual address miss data;
      circuitry to store said virtual address miss data describing said miss to enable an operating system to recover from said miss; and
      circuitry to compute a second pointer from said virtual address miss data to a second index into said virtual hash page table, said second index in the virtual hash page table comprising a second translation to said physical address.

2. The apparatus of claim 1, wherein said index further comprising:
   a virtual index used as a virtual address into said virtual hash page table.

3. The apparatus of claim 1, further comprising:
   logic configured for an operating system to duplicate said mechanism used to compute said pointer from said virtual address.

4. The apparatus of claim 3, wherein said virtual hash page table apparatus configuration further indicates the format of translation pointer entries in said virtual hash page table.

5. The apparatus of claim 1, wherein said mechanism for virtual address translation further comprising:
   circuitry to save virtual address miss data.

6. A method for use in processor for translating a virtual address, the method comprising the steps of:
   configuring a virtual hash page table to allow both linear access and hashed access;
   calculating a pointer from a virtual address;
   utilizing said pointer to search said virtual hash page table for a virtual address translation to a physical address;
   providing virtual address miss data on a translation miss;
   storing said virtual address miss data describing said translation miss to enable an operating system to recover from said translation miss; and
   computing a second pointer from said virtual address miss data, utilizing said second pointer to search said virtual hash page table for a second translation to said physical address.

7. The method of claim 6, wherein the set of calculating further includes:
   using a value from a region register and a value from said virtual address for said calculation.

8. The method of claim 6, further including the step of:
   searching said virtual hash page table using linear access.

9. The method of claim 6, further including the steps of:
   searching said virtual hash page table using hashed access; and
   computing a tag that uniquely identifies said translation given said index of said hashed access.

10. The method of claim 6, wherein said calculating a pointer from a virtual address step further including the step of:
    computing a virtual index used as a virtual address into said virtual hash page table.

11. The method of claim 6, further including the steps of:
    generating virtual address miss data if said search of said virtual hash page table for a virtual address translation to a physical address fails.

12. A virtual hash page table apparatus for virtual address translation after a failed translation lookaside buffer search, comprising:
    means for configuring a virtual hash page table to allow both linear access and hashed access;
    means for calculating a pointer from a virtual address;
    means for utilizing said pointer to search said virtual hash page table for a virtual address translation to a physical address;
    means for providing virtual address miss data on a translation miss; and
    means for storing said virtual address miss data describing said translation miss to enable an operating system to recover from said translation miss; and
    means for computing a second pointer from said virtual address miss data, said second pointer into said virtual hash page table for a second translation to said physical address.

13. The virtual hash page table apparatus of claim 12, further comprising:
    means for using a value from a region register and a value from said virtual address for said calculation.

14. The virtual hash page table apparatus of claim 12, further comprising:
    means for searching said virtual hash page table using linear access.

15. The virtual hash page table apparatus of claim 12, further comprising:
    means for searching said virtual hash page table using hashed access; and
    means for computing a tag that uniquely identifies said translation given said index of said hashed access.

16. The virtual hash page table apparatus of claim 12, wherein said means for calculating a pointer further comprises:
    means for computing a virtual index used as a virtual address into said virtual hash page table.

17. The virtual hash page table apparatus of claim 12, further comprising:
    means for generating virtual address miss data if said search of said virtual hash page table for said virtual address translation to said physical address fails.

* * * * *

UNITED STATES PATENT AND TRADEMARK OFFICE
CERTIFICATE OF CORRECTION

PATENT NO.    : 6,216,214 B1  
DATED         : April 10, 2001  
INVENTOR(S)   : Bryg et al.

It is certified that error appears in the above-identified patent and that said Letters Patent is hereby corrected as shown below:

<u>Column 12,</u>
Line 30, after "miss;" delete "and"

Signed and Sealed this

Tenth Day of December, 2002

JAMES E. ROGAN
*Director of the United States Patent and Trademark Office*